No. 816,999. PATENTED APR. 3, 1906.
H. H. PRAHL & E. H. KISTNER.
BENCH STOP.
APPLICATION FILED MAR. 25, 1905.

2 SHEETS—SHEET 1.

Witnesses
Frank P. Hough
D. W. Gould

Inventors
H. H. Prahl.
E. H. Kistner.

By Victor J. Evans
Attorney

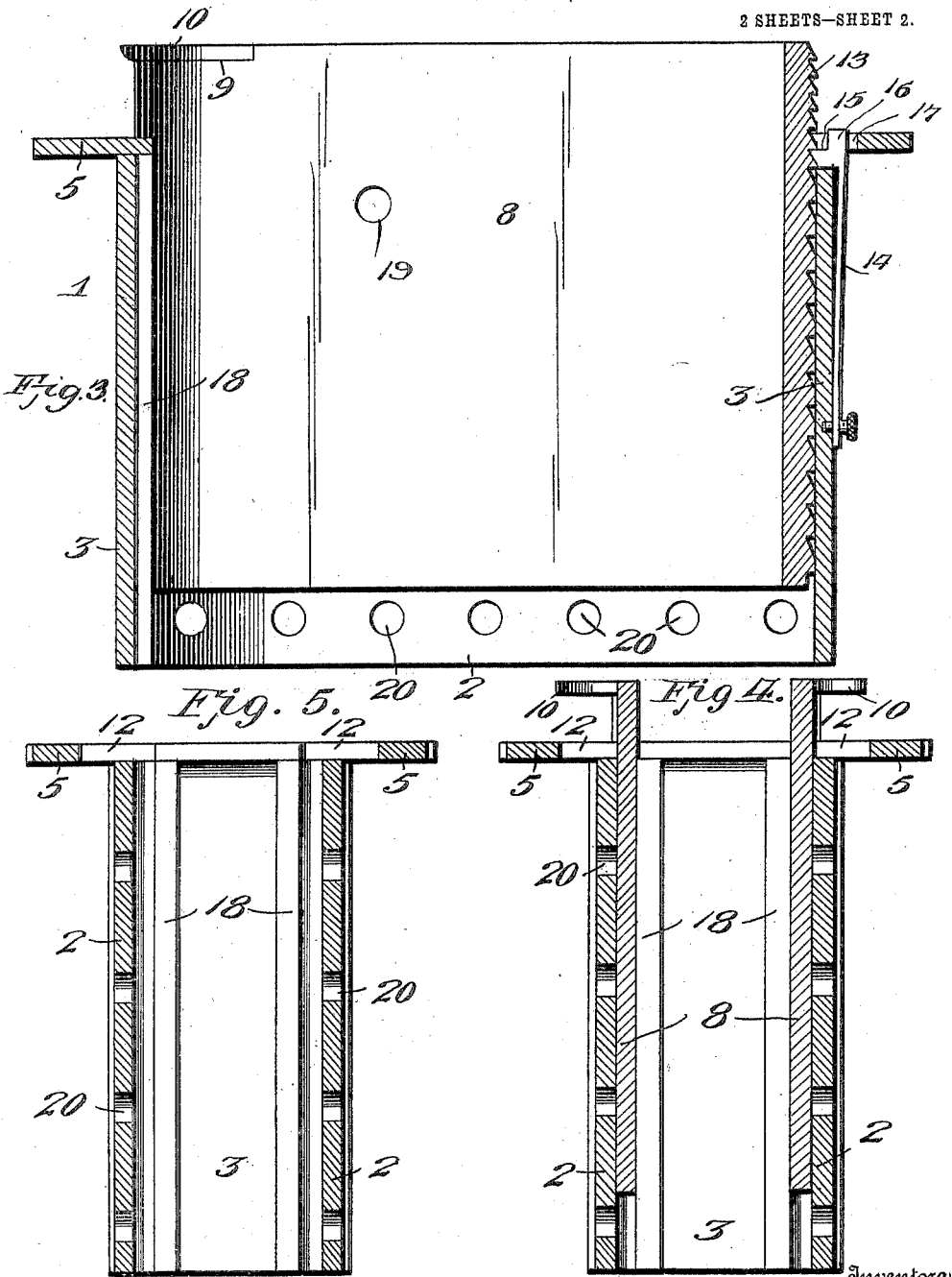

UNITED STATES PATENT OFFICE.

HANS H. PRAHL AND EBER H. KISTNER, OF INDEPENDENCE, KANSAS.

BENCH-STOP.

No. 816,999.  Specification of Letters Patent.  Patented April 3, 1906.

Application filed March 25, 1905. Serial No. 252,065.

*To all whom it may concern:*

Be it known that we, HANS H. PRAHL and EBER H. KISTNER, citizens of the United States, residing at Independence, in the county of Montgomery and State of Kansas, have invented new and useful Improvements in Bench-Stops, of which the following is a specification.

The invention relates to an improvement in carpenters' benches, and particularly to a bench-stop designed for use in connection with the bench.

The main object of the invention is the production of a bench-stop wherein the dog is designed to be vertically adjusted with relation to the bench and adapted for holding boards or the like for surfacing or joining.

The invention in its preferred form will be described in the following specification, reference being had to the accompanying drawings, in which—

Figure 1:
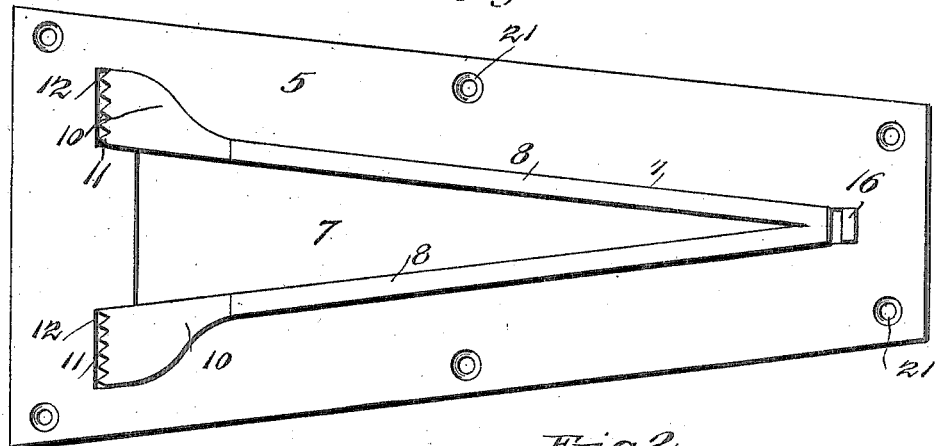
Figure 2:
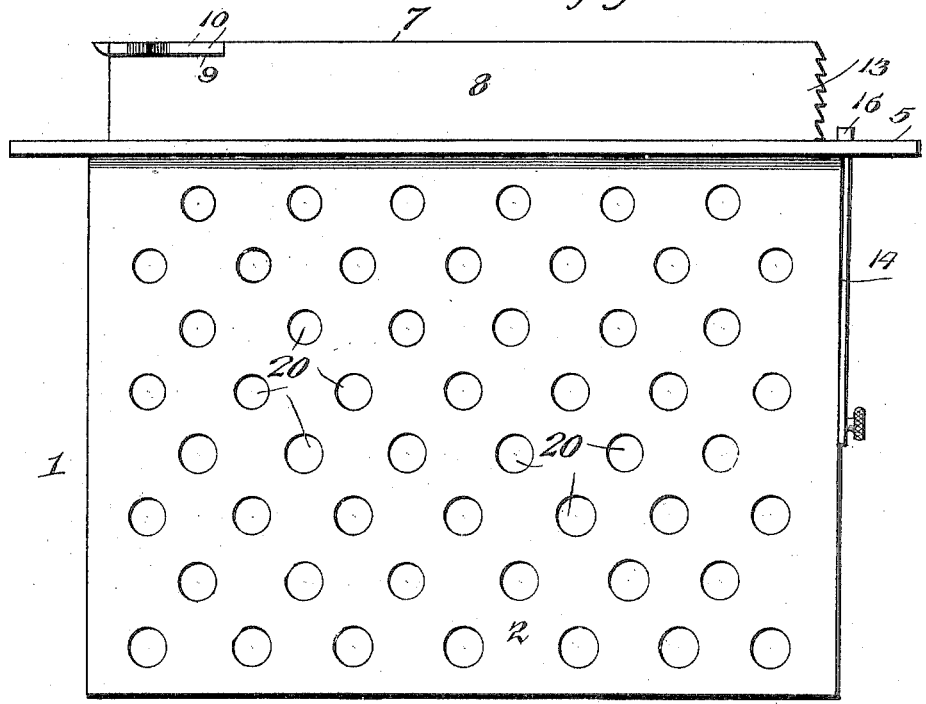

Figure 1 is an plan view of our improved bench-stop. Fig. 2 is a side elevation of the same, the dog being shown in an elevated position. Fig. 3 is a vertical longitudinal section through the bench-stop as illustrated in Fig. 2. Fig. 4 is a transverse vertical section of the same. Fig. 5 is a transverse vertical section through the supporting-frame for the dog.

Referring to the drawings, our improved bench-stop comprises a supporting-frame 1, preferably V-shaped in longitudinal section and comprising side walls 2 and end walls 3. On its upper end the frame is provided with a horizontally-arranged plate 5, centrally apertured coincidently with the space between the walls of the frame and projecting beyond said walls to provide a horizontal flange projecting at right angles from the frame-walls. The frame is designed to be seated in an opening formed in the bench proper, the bench-surface adjacent said opening being suitably recessed to receive the plate 5 of the frame, whereby said frame is supported in a vertical position in the bench with the upper surface of the plate 5 in a plane with the surface of the bench.

7 represents the dog, which is V-shaped and which comprises side walls 8, arranged to fit within the space between the side walls 2 of the frame. The upper edge of each of the walls 8 of the dog, at the open end thereof, is recessed at 9 to receive a holding member 10, the free end of which is widened and projects beyond the vertical edge of the walls 8. The projecting portion of each of the members 10 is serrated or roughened at 11 to provide a gripping edge. The upper surface of the members 10 is in alinement with the upper edge of the walls 8 of the dog, and the face-plate 5 of the frame is suitably recessed at 12 to receive the projecting ends of the members. The apex of the dog is formed with a series of vertically-arranged teeth 13, adapted to be engaged by a spring-catch 14, secured to the front wall 3 of the frame 1. The catch 14 has a rearwardly-projecting lug 15, arranged for engagement with the teeth 13 and with a finger-piece 16, projecting upwardly therefrom and operating in a recess 17, formed in the face-plate 5 of the frame.

Although it is desirable to construct the dog proper with an open end with a view to rendering the same simple, cheap, and easy of manufacture, yet it is necessary to provide means which will prevent the free ends of the walls of the dog from moving inward toward each other as a result of any inward strain brought to bear upon either of the walls and result in their becoming distorted or broken at their point of union. To accomplish this, we secure vertically-arranged strips 18 upon the rear wall of the frame, said strips being spaced from the side walls of the frame a distance sufficient to receive the ends of the side walls of the dog. These strips 18 not only serve to prevent injury to the walls of the V proper, but also serve to guide the dog in its movement and adapt the same to be easily adjusted.

In operation the dog is elevated above the face-plate of the frame to the desired distance to receive and secure the material to be operated upon, in which movement of the dog the lug 15 of the catch 14 will ride the teeth 13 of the dog. In adjusted position the catch 15 will engage the teeth 13 to prevent accidental downward movement of the dog. The members 10 will serve through a slight elevation of the dog as stops against which the edge of the timber may be placed in surfacing or the like, while the V arrangement of the walls of the dog will serve to hold a board on edge for convenient manipulation. The V formation of these walls provides for holding boards of various thicknesses, as will be evident.

As a means for the convenient elevation of the dog we provide the walls 8 thereof with an opening 19, whereby a hook or the finger of the operator may be utilized to draw the dog upward. The side walls of the frame 1 are also preferably formed with a large number of perforations 20, mainly to lighten this part of the structure without materially decreasing its strength.

We have shown the face-plate 5 of the frame as provided with screw-holes 21, by means of which the bench-stop may be secured to the bench; but it is evident that other fastening means may be employed, if desired.

From the construction described it will be noted that the dog is vertically adjustable and automatically locked in its adjusted position, simple manipulation of the catch 14 to withdraw its lugs 15 from the teeth 13 of the dog releasing said dog and permitting it to be returned to normal position by pressure or by gravity.

Having thus described our invention, what we claim is—

A bench-stop comprising a casing including converging side plates, rear and front walls joining said side plates, and a face-plate secured to the upper ends of said side and end plates, said face-plate being formed with an opening, a V-shaped dog slidably mounted in said opening and provided with a forward opening, holding members recessed into the upper edges of the walls of the dog and widened and projected beyond the vertical edges of the V-walls, and vertical strips secured to the front wall of the casing and spaced from the converging walls thereof, said strips receiving the free ends of the dog and serving to prevent injury to the walls thereof and to guide the dog in its movement.

In testimony whereof we affix our signatures in presence of two witnesses.

HANS H. PRAHL.
EBER H. KISTNER.

Witnesses:
JOHN BERTENSHAW,
A. T. STEWARD.